Oct. 28, 1958     H. O. SCHJOLIN ET AL     2,858,142
TORSION BAR INDEPENDENT WHEEL SUSPENSION
Filed Nov. 15, 1956     3 Sheets-Sheet 3
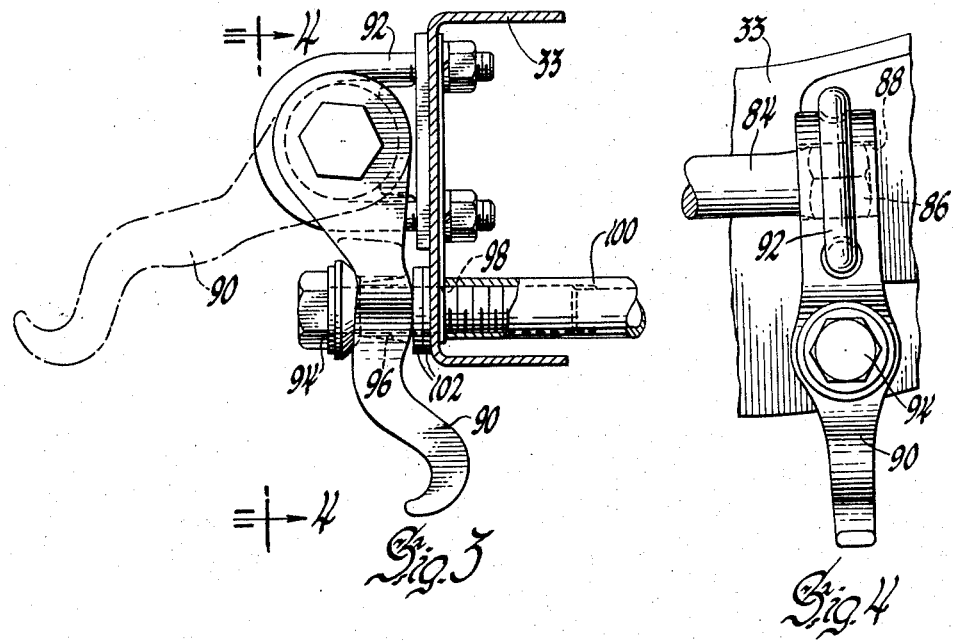
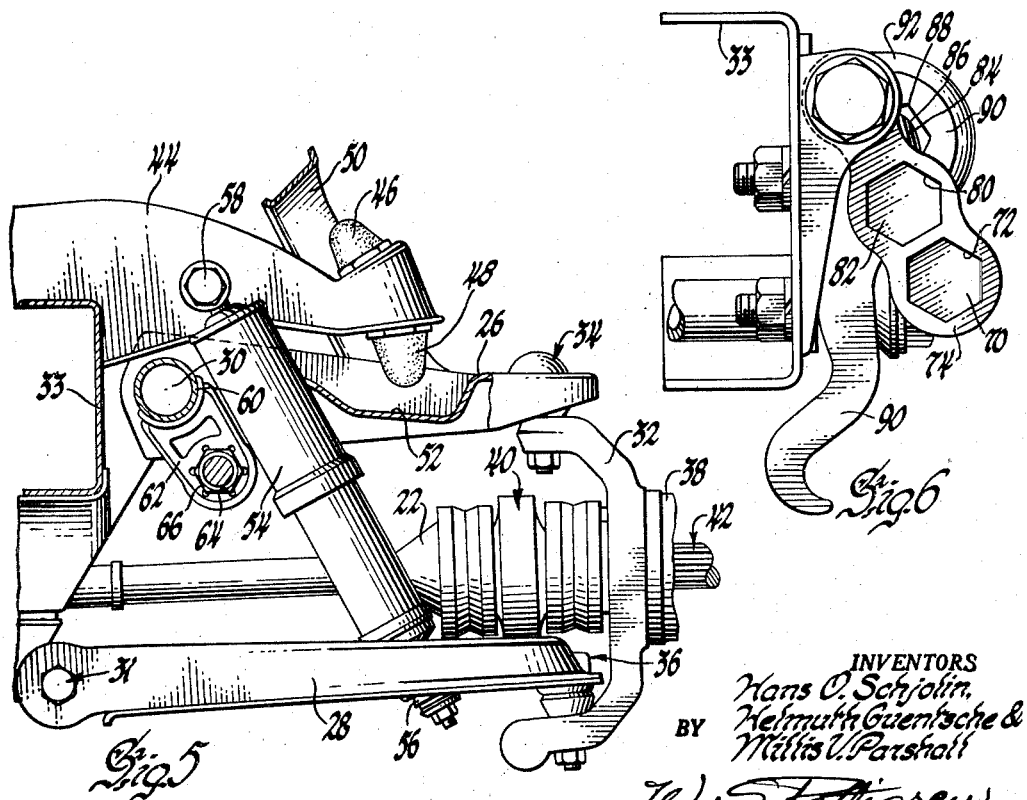
INVENTORS
Hans O. Schjolin,
Helmuth Guentsche &
BY Millis V. Parshall
W. S. Pettigrew
ATTORNEY United States Patent Office 2,858,142
Patented Oct. 28, 1958

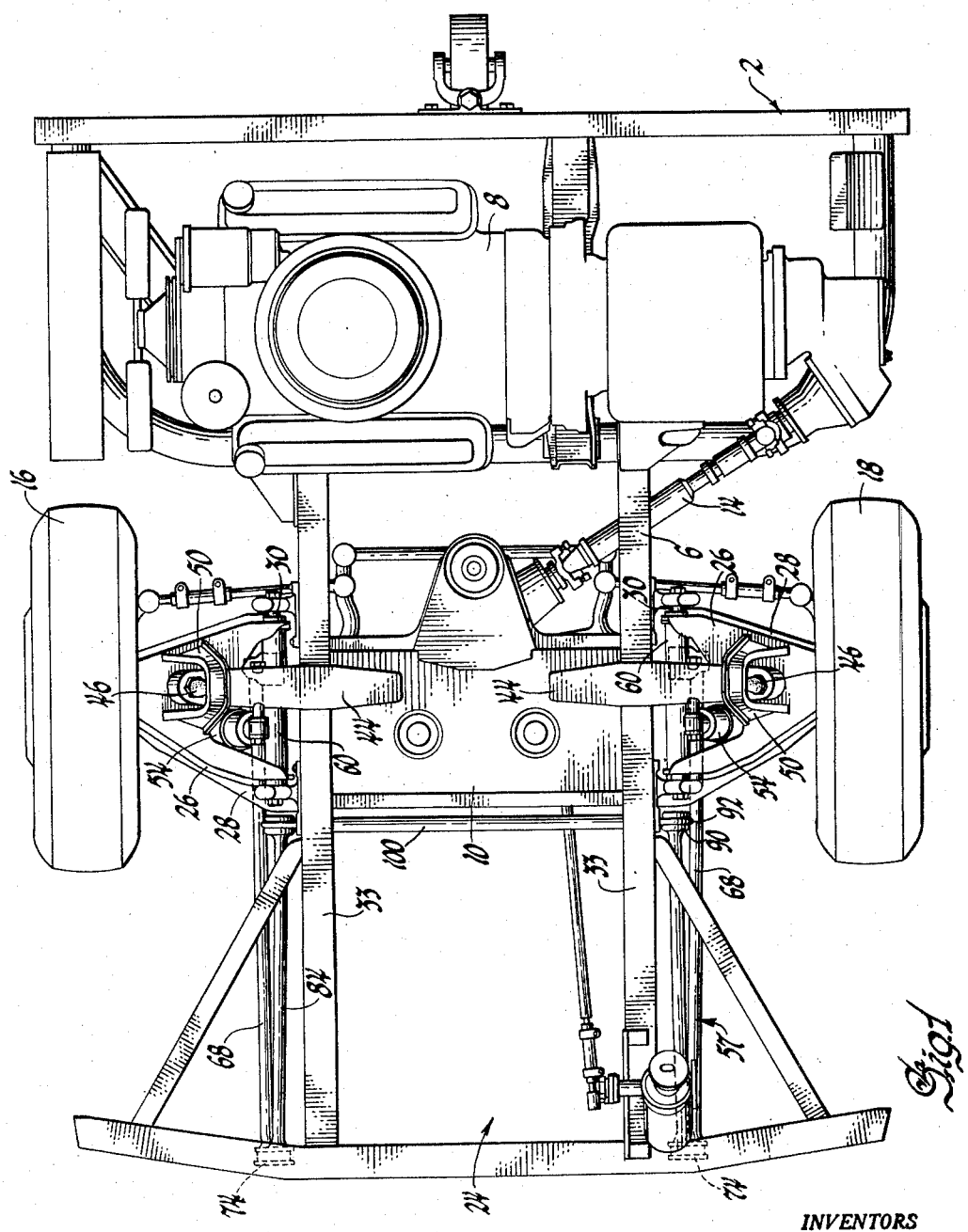

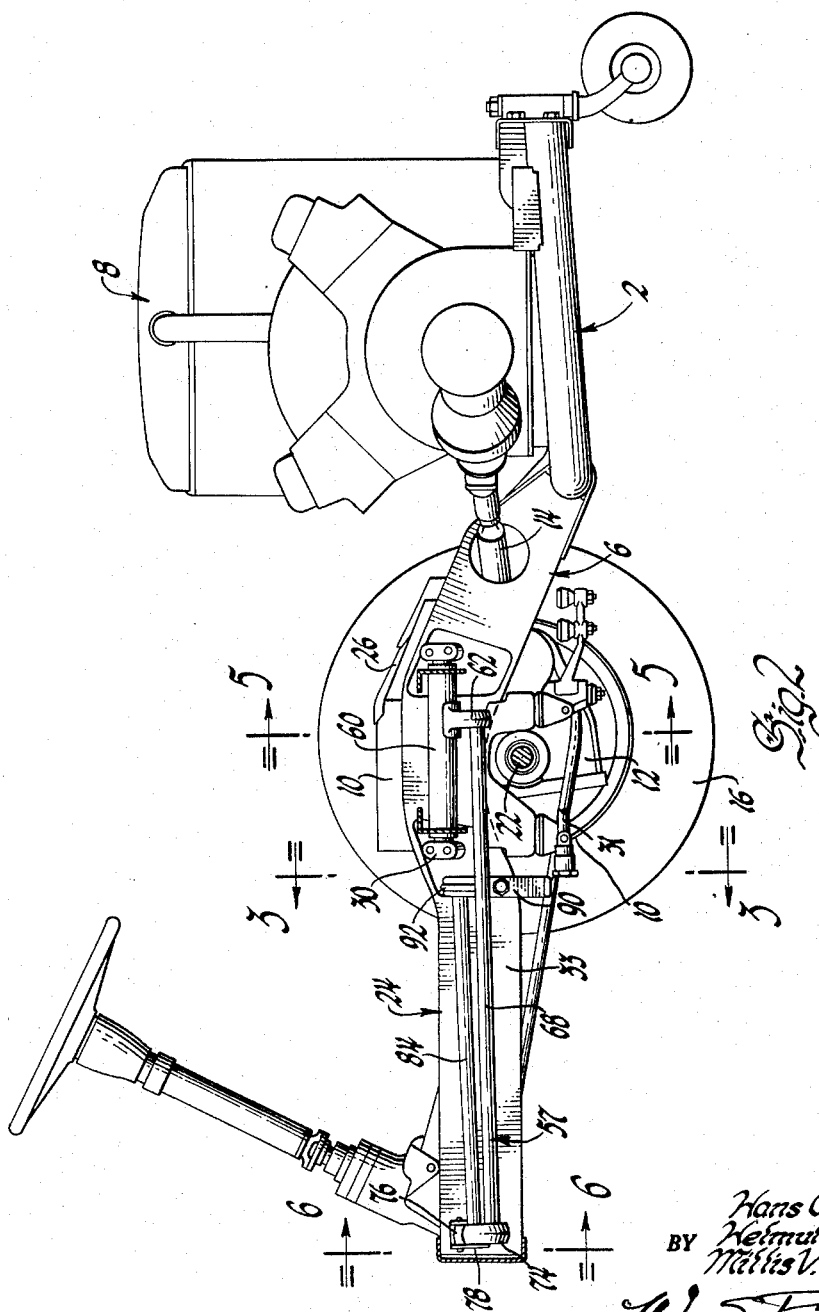

2,858,142

TORSION BAR INDEPENDENT WHEEL SUSPENSION

Hans O. Schjolin, Birmingham, and Helmuth Guentsche and Millis V. Parshall, Pontiac, Mich., assignors to General Motors Corporation, Detroit, Mich., a corporation of Delaware Application November 15, 1956, Serial No. 622,313

10 Claims. (Cl. 280—124)

This invention relates to vehicle suspension and more particularly, although not exclusively, to independent suspension for driven vehicle wheels.

An object of the invention is to provide an improved vehicle suspension.

Another object is to provide a torsion bar independent suspension for driven vehicle wheels.

A further object is to provide an improved torsion bar independent wheel suspension including a simplified mechanism for applying initial torsional wind-up to establish vehicle standing height.

Still another object is to provide an independent wheel suspension wherein the sprung mass is supported relative to the unsprung mass by means of torsion bars arranged in folded series.

A still further object is to provide a suspension of the stated character wherein the torsion bars are anchored to the vehicle frame by a common tie bar which is effective to relieve the latter from stress loading resulting from equal torsional deflection of the torsion bars.

These and other objects, advantages and features of the invention will become more fully apparent as reference is had to the accompanying specification and drawings wherein:

Fig. 1 is a plan view of a vehicle chassis incorporating the present invention.

Fig. 2 is a side elevational view, partly in section, of the structure illustrated in Fig. 1.

Fig. 3 is an enlarged fragmentary sectional view looking in the direction of arrows 3—3 of Fig. 2.

Fig. 4 is an enlarged fragmentary view looking in the direction of arrows 4—4 of Fig. 3.

Fig. 5 is an enlarged fragmentary view looking in the direction of arrows 5—5 of Fig. 2, certain parts being shown in section to more clearly illustrate the construction; and Fig. 6 is an enlarged fragmentary view, partly in section, looking in the direction of arrows 6—6 of Fig. 2.

Referring now to the drawings and particularly Figs. 1 and 2, the invention is shown applied to a front wheel drive vehicle sub-chassis 2. Sub-chassis 2 includes a frame structure 6 having a power plant 8 mounted transversely thereon at one end thereof. Forwardly of power plant 8, frame 6 is provided with an intermediate cross frame member 10 which has suspended therefrom a differential drive mechanism 12. A propeller shaft 14 extends diagonally between and operatively connects power plant 8 with differential 12. Disposed at lateral opposite sides of differential 12 are a pair of dirigible wheels 16 and 18 which are independently supported on frame 6 in a manner shortly to be described. Wheels 16 and 18 are adapted to be driven by a pair of half axles 22 which extend laterally outwardly from differential 12. In the general construction shown, frame 6 extends forwardly of the wheel and axle structure to provide a driver compartment supporting portion 24 from which unobstructed vision is afforded the operator.

In accordance with the general features of the invention, dirigible wheels 16 and 18 are mounted for independent vertical movement relative to frame 6. Since it is evident that the component parts and arrangement of the suspension for each wheel 16 and 18 are identical except in the reverse sense, the description will be given with particular reference to the structure associated with wheel 18, like elements of the structure associated with wheel 16 being identified by corresponding reference numerals. As seen in Figs. 1 and 5, a pair of vertically spaced transversely extending upper and lower wishbone arms 26 and 28, respectively, are pivotally mounted at their inboard ends on pivot shafts 30 and 31 secured to frame side rail 33 for movement about generally parallel longitudinally extending axes. At their outer ends, arms 26 and 28 are pivotally connected to a generally vertically extending wheel support member 32 by means of ball and socket assemblies 34 and 36. As seen best in Fig. 5, support member 32 has formed integrally thereon a hollow wheel spindle 38 upon which wheel 18 is rotatably supported. The outer end of half axle 22 is operatively connected by means of a constant velocity universal joint 40 to a stub driving axle 42. Stub axle 42, in turn, is supported in and extends through hollow spindle 38 to effect driving engagement with wheel 18.

In order to limit the maximum compression and rebound position of wheel 18 and arms 26 and 28, a rigid outrigger member 44 is disposed centrally over upper wishbone 26. At its inner end, member 44 is welded or otherwise firmly secured to cross member 10. Secured on the outer end of outrigger 44 are a pair of rubber bumper elements 46 and 48 which extend upwardly and downwardly, respectively, from member 44. Disposed in straddling relation over the outer end of outrigger 44 is a generally U-shaped channel member 50, the lower ends of which are secured, as by welding, to the upper surface of upper wishbone arm 26. In operation, bumper 48 resiliently arrests upward movement of wishbone arm 26 when engaged by the intermediate surface 52 thereof. Conversely, downward swinging movement of the wheel 18 and wishbone arm 26 causes the arched portion of member 50 to engage the end of bumper 46 to limit wheel rebound. A conventional telescopic shock absorber 54, disposed immediately forwardly of half axle 22, is connected at one end 56 to lower wishbone arm 28 and at the other end 58 to an intermediate point on outrigger 44.

Since the major portion of the space between upper wishbone arm 26 and lower wishbone arm 28 is occupied by half axle 22 and shock absorber 54, it is desirable that an elastic medium be provided which need not be located in the extremely limited remaining space between the wishbone arms. To this end, the elastic medium of the present invention takes the form of a retroflexed or folded series torsion spring assembly 57.

As seen best in Fig' 2, the inboard forked end of upper wishbone 26 is provided with a longitudinally extending tubular member 60 which surrounds pivot shaft 30. A lever 62 is secured to tubular member 60 as by welding and extends outwardly and downwardly therefrom. At its outer end, lever 62 is formed with a hexagonal longitudinally extending aperture 64 in which is received the cooperating hexagonal end portion 66 of a first torsion spring 68. At is forward end spring 68 is formed with a second hexagonal end portion 70 which is received in a cooperating hexagonal aperture 72 formed in the lower end of a swingable transfer lever 74. Transfer lever 74, in turn, is pivotally supported at its upper end 76 on a bracket 78 which, in turn, is secured to the side frame member 33 adjacent the forward extremity of the latter. Intermediately of its upper and lower ends, transfer lever 74 is formed with a second hexagonal aperture 80 adapted to receive the hexagonal forward end portion 82 of a second torsion spring 84. At its rearward end spring 84 is formed with a hexagonal end 86 which is received in a hexagonal aperture 88 formed in the upper end of an anchor lever 90. Anchor lever 90 is rotatably secured to side frame 33 by means of a U-bolt 92 located immediately forwardly adjacent upper wishbone arm 26.

As seen best in Fig. 3, anchor lever 90 may be rotated approximately 180° from an upwardly extending position to a downwardly depending position flush with the side wall of side frame member 33. By virtue of this feature, the component parts of spring assembly 56 may be assembled in free position, the anchor lever thereafter being rotated downwardly by any suitable power device until springs 68 and 84 are torsionally loaded sufficiently to achieve the desired standing height of the sprung mass. Lever 90 is then secured in this selected position by a machine bolt 94. Bolt 94 extends through an aperture 96 formed intermediately in lever 90 and an aligned aperture 98 formed in side frame 33 to threadably engage one end of a transversely extending tubular tie bar 100. The opposite end of tie bar 100 is similarly secured to the corresponding anchor 90 of spring assembly 56 for wheel 16. A suitable number of shims 102, disposed between side frame 33 and anchor 90, accommodate initial variations in preload wind-up of the torsion bars and permit subsequent adjustments thereof within reasonable limits. It should be particularly noted that each anchor 90 is connected to tie bar 100 rather than being directly secured to the corresponding side rail 33. As a result, normal static loading of frame 6 or any other condition producing equal deflection of wheels 16 and 18 causes the respective spring assemblies for wheels 16 and 18 to react against each other and exert tension on tie bar 100, thus preventing localized stresses on the frame structure.

As previously pointed out, torsion bar 68 is disposed in generally parallel outwardly spaced relation with the inboard pivot shaft 30 for upper wishbone arm 26. By arranging bar 68 in the manner described, a conventional inboard pivotal connection for wishbone arm 26 may be utilized. It will, of course, be evident that a conventional torsion bar disposed in the manner described would be subjected to considerable bending stresses as well as torsional wind-up during deflection of the wheel. However, in the present construction bending stresses on spring assembly 57 may be accurately controlled and, if desired, maintained at a very low level. To this end, in accordance with the present invention, torsion bars 68 and 84 are arranged in forwardly converging relation so that the projected axes thereof are non-paralled both in side elevation and plan view (Figs. 1 and 2). As a result, when wishbone 26 is deflected upwardly by vertical wheel movement, bending stresses imposed on bar 68 are substantially reduced by concurrent upward swinging movement of transfer lever 74. Although upward swinging movement of lever 74 tends to impose bending stresses on bar 84, because of the short radius of arc of the end 80 of bar 84 about the hinge axis 76, such bending deflection is minimized. Accordingly, resilient support of the sprung mass results primarily from torsional deflection of bars 68 and 84. It will, of course, be appreciated that the relative proportions of torsional and bending stresses may be varied in order to secure optimum results.

Because of controlled division of torsional and bending stresses and the greatly increased effective length of the torsion bars, the present invention provides a suspension possessing both low spring rate and an exceptionally low stress lever. In addition, the arrangement of the resilient medium is such as to provide minimum interference with other elements of the suspension construction and is thus admirably suited for driven steerable wheel suspension.

Although shown as applied to a particular form of front wheel drive vehicle sub-chassis, it will be evident that the present invention is in no sense restricted to any particular form of vehicle, the embodiment shown being for illustrative purposes only. It is, therefore, to be understood that the invention is not limited to the embodiments shown, but only by the scope of the claims which follow.

We claim:

1. A spring assembly for independent wheel suspension of the type including a frame having a wheel guiding arm pivoted thereon on a generally horizontal axis, said assembly comprising a pair of straight torsion bars arranged in generally side by side relation, a rigid member connecting the adjacent ends of said bars together, means pivotally connecting said rigid member to said frame, means connecting the free end of one of said bars to said arm substantially parallel with and spaced from said horizontal axis, an anchor member on the free end of said other bar, means securing said anchor on said frame so that the former may be rotated to impart sufficient torsional wind-up to said assembly from its free position to support said frame relative to said wheel, and means for retaining said anchor in its adjusted angular position.

2. A spring assembly for independent wheel suspension of the type including a frame having a wheel guiding arm pivoted thereon on a generally horizontal axis, said assembly comprising a pair of straight torsion bars arranged in generally side by side relation, a rigid member connecting the adjacent ends of said bars together, means pivotally connecting one end of said rigid member to said frame, means connecting the free end of one of said bars to said arm parallel with and spaced from said horizontal axis, an anchor member on the free end of said other bar, means securing said anchor on said frame so that the former may be rotated to impart sufficient torsional wind-up to said assembly from its free position to support said frame relative to said wheel, and means for retaining said anchor in its adjusted angular position.

3. A spring assembly for independent wheel suspension of the type including a frame having a pair of wheel guiding arms pivoted thereon on vertically spaced generally horizontal axes, said assembly comprising a pair of straight torsion bars arranged in forwardly converging generally side by side relation, a rigid member connecting the adjacent forward ends of said bars together, a depending lever on one of said arms connected at its outer end to the rearward end of one of said bars, an anchor member on the rearward end of said other bar, means rotatably securing said anchor on said frame so that the former may be turned to impart sufficient torsional wind-up to said assembly from its free position to support said frame relative to said wheel, and means for retaining said anchor in its adjusted angular position.

4. Vehicle suspension comprising, in combination, a frame, a pair of road wheels each pivotally connected to the outer ends of a pair of vertically spaced guiding links, means pivotally connecting the inner ends of said links to said frame for swinging movement about generally horizontal axes, an arched member secured on the upper surface of each of the upper of said links, a pair of outriggers rigidly attached to said frame and extending into the space between the adjacent arched member and its link, a pair of vertically oppositely facing resilient abutments disposed on each of said outriggers, one of said pairs of abutments engaging said arched member upon predetermined downward swinging movement of said link and the other abutment engaging said link body upon predetermined upward swinging movement thereof, and a spring assembly resiliently restraining upward swinging movement of said link.

5. Vehicle suspension comprising, in combination, a frame, a pair of road wheels each pivotally connected to the outer ends of a pair of vertically spaced guiding links, means pivotally connecting the inner ends of said links to said frame for swinging movement about generally horizontal axes, an arched member secured on the upper link of each pair, a pair of outriggers rigidly attached to said frame and extending into the space between the adjacent arched member and its link, a pair of vertically oppositely facing resilient abutments disposed on each of said outriggers, one of said abutments on each outrigger engaging an arched member upon predetermined downward swinging movement of its link and the other abutment on each outrigger engaging said link body upon predetermined upward swinging movement thereof, and torsion spring means resiliently restraining upward swinging movement of said links.

6. Vehicle suspension comprising, in combination, a frame, a pair of road wheels each pivotally connected to the outer ends of a pair of vertically spaced guiding links, means pivotally connecting the inner ends of said links to said frame for swinging movement about generally horizontal axes, an arched member secured on the upper link of each pair, a pair of outriggers rigidly attached to said frame and extending into the space between the adjacent arched member and its link, a pair of vertically oppositely facing resilient abutments disposed on each of said outriggers, one of said abutments on each outrigger engaging said arched member upon predetermined downward swinging movement of said link and the other abutment engaging said link body upon predetermined upward swinging movement thereof, a torsion spring assembly resiliently restraining upward swinging movement of said link, said assembly comprising a pair of torsion bars disposed in side by side forwardly converging relation, a rigid member connecting the respective forward ends of said bars together, means connecting the rearward end of one of said bars to one of said links in spaced relation from the said pivotal connection thereof, and an anchor lever on the rearward end of the other bar, said anchor lever being rotatably mounted on said frame and movable through an arcuate range sufficient to impose initial torsional wind-up to said assembly capable of supporting the vehicle frame.

7. A vehicle suspension comprising, in combination, a frame, a pair of road wheels dirigibly connected to the outer ends of a pair of vertically spaced guiding links, means pivotally connecting the inner ends of said links to said frame for swinging movement about generally horizontal axes, an arched member secured on each of said upper links, a pair of outriggers rigidly attached to said frame and extending into the space between the adjacent arched member and its link, a pair of vertically oppositely facing resilient abutments disposed on each of said outriggers, one of said abutments in each pair engaging the adjacent arched member upon predetermined downward swinging movement of the associated link and the other abutment engaging said link body upon predetermined upward swinging movement thereof, and a pair of torsion spring assemblies resiliently restraining upward swinging movement of said upper link.

8. A vehicle suspension comprising, in combination, a frame, a pair of driven road wheels dirigibly connected to the outer ends of a pair of vertically spaced guiding links, means pivotally connecting the inner ends of said links to said frame for swinging movement about generally horizontal axes, an arched member secured on each of said upper links, a pair of outriggers rigidly attached to said frame and extending into the space between the adjacent arched member and its link, a pair of vertically oppositely facing resilient abutments disposed on each of said outriggers, one of said abutments in each pair engaging the adjacent arched member upon predetermined downward swinging movement of the associated link and the other abutment engaging said link body upon predetermined upward swinging movement thereof, and a pair of torsion spring assemblies resiliently restraining upward swinging movement of said upper link.

9. A vehicle suspension comprising, in combination, a frame, a road wheel dirigibly connected to the outer ends of a pair of vertically spaced guiding links, means pivotally connecting the inner ends of said links to said frame for swinging movement about generally horizontal axes, an arched member secured on the upper surface of said upper link, an outrigger rigidly attached to said frame and extending into the space between the arched member and its associated link, a pair of vertically oppositely facing resilient abutments disposed near the end of said outrigger, one of said abutments engaging said arched member upon predetermined downward swinging movement of said link and the other abutment engaging said link body upon predetermined upward swinging movement of said link, a spring assembly resiliently restraining upward swinging movement of said link, said assembly comprising a pair of torsion bars connected together in folded series, means operatively connecting one of said bars to said upper link, an anchor lever secured to the other of said bars, means rotatably supporting said anchor on said frame, and a reaction member engaging said anchor to resist rotary movement thereof.

10. A vehicle suspension comprising, in combination, a frame, a road wheel dirigibly connected to the outer ends of a pair of vertically spaced guiding links, means pivotally connecting the inner ends of said links to said frame for swinging movement about generally horizontal axes, an arched member secured on the upper surface of said upper link, an outrigger rigidly attached to said frame and extending into the space between the arched member and its associated link, a pair of vertically oppositely facing resilient abutments disposed near the end of said outrigger, one of said abutments engaging said arched member upon predetermined downward swinging movement of said link and the other abutment engaging said link body upon predetermined upward swinging movement of said link, a spring assembly resiliently restraining upward swinging movement of said link, said assembly comprising a pair of torsion bars connected together in folded series, means operatively connecting one of said bars to said upper link, an anchor lever secured to the other of said bars, means rotatably supporting said anchor on said frame, and a reaction member carried by said frame, said member being connected at its opposite ends to one of each of said anchors in such a manner that torsional loading of said spring assemblies exerts tension on said reaction member whereby said frame is relieved of stresses resulting from uniform loading of said spring assemblies.

References Cited in the file of this patent

UNITED STATES PATENTS

| | | |
|---|---|---|
| 2,414,674 | Slack | Jan. 21, 1947 |
| 2,542,026 | Hickman | Feb. 20, 1951 |
| 2,631,844 | Paton | Mar. 17, 1953 |